United States Patent [19]
Schulze et al.

[11] Patent Number: 6,086,232
[45] Date of Patent: Jul. 11, 2000

[54] DEVICE FOR ADJUSTING THE RANGE OF HEADLAMPS

[75] Inventors: Werner Schulze, Trochtelfingen; Elefterios Konto, Ludwigsburg; Michael Westermann, Hochdorf, all of Germany

[73] Assignee: Robert Bosch GmbH, Stuttgart, Germany

[21] Appl. No.: 09/077,050

[22] PCT Filed: Sep. 20, 1997

[86] PCT No.: PCT/DE97/02136

§ 371 Date: May 18, 1998

§ 102(e) Date: May 18, 1998

[87] PCT Pub. No.: WO98/21068

PCT Pub. Date: May 22, 1998

[30] Foreign Application Priority Data

Nov. 11, 1996 [DE] Germany ............... 196 46 282

[51] Int. Cl.[7] .................................. B60Q 1/068
[52] U.S. Cl. .................. 362/523; 362/272; 362/274; 362/288; 362/524; 74/89.14; 74/625
[58] Field of Search ................... 74/89.14, 625; 362/272–274, 286, 288, 289, 514, 523, 524, 529, 532, 428

[56] References Cited

U.S. PATENT DOCUMENTS 3,070,687  12/1962  Marchant .................................. 74/625
4,524,407   6/1985  Igura ....................................... 362/273
5,251,114  10/1993  Cantin et al. ........................... 362/524
5,580,149  12/1996  Kusagaya ................................ 362/289

FOREIGN PATENT DOCUMENTS 29 52 217 A1  7/1981  Germany .

*Primary Examiner*—Alan Cariaso
*Attorney, Agent, or Firm*—Michael J. Striker

[57] ABSTRACT

The device has a drive motor (30), which via a gear drives a gear wheel (33), which is connected to a sleeve (40) through which an adjusting bolt (44) is inserted. The adjusting bolt (44) can be coupled to the sleeve (40) via a set of teeth (43, 48) in the direction of rotation about its longitudinal axis (17), and the coupling of the adjusting bolt (44) is secured by an axially prestressed spring (57) engaging it. A connecting element (16) pivotably connected to the headlight part to be adjusted is coupled in the direction of rotation to the adjusting bolt (44), and the adjusting bolt (44) is displaceable relative to this connecting element in the direction of the longitudinal axis (17). The adjusting bolt (44) is displaceable in the direction of the longitudinal axis (17) counter to the prestressing of the spring (57), so that it is uncoupled from the sleeve (40) and is rotatable relative to the sleeve (40) via an actuating element (58). A rotation of the adjusting bolt (44) is transmitted to the connecting element (16), and a basic setting of the range of the headlight independently of the drive motor is made possible.

10 Claims, 4 Drawing Sheets

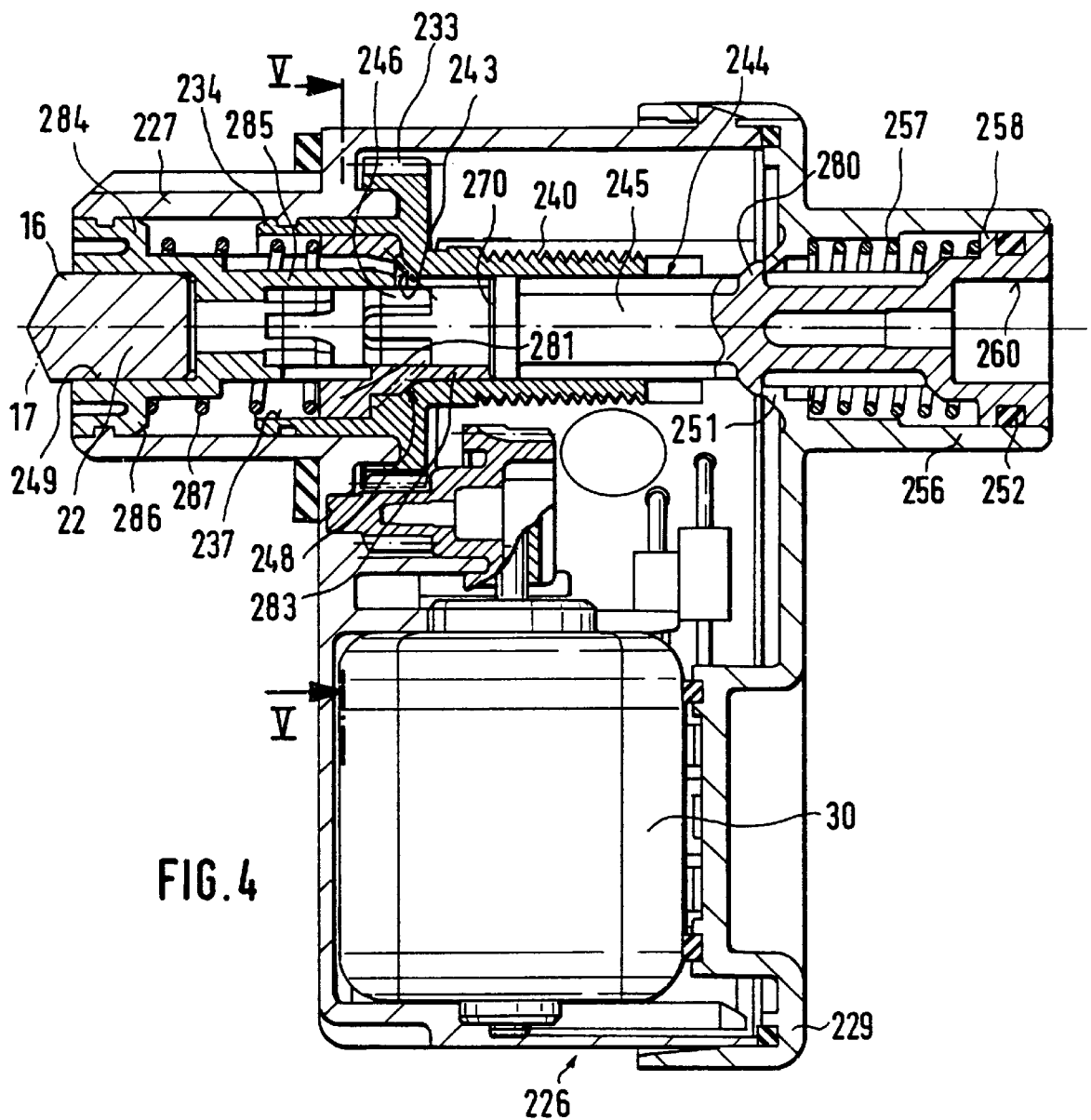
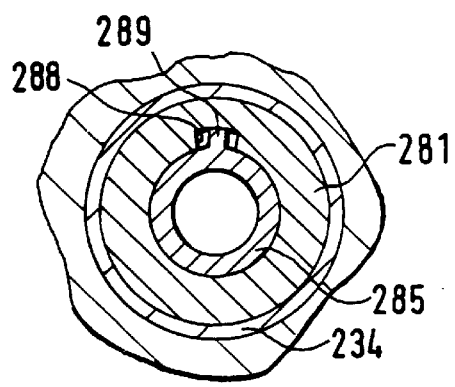
FIG. 4
FIG. 5

DEVICE FOR ADJUSTING THE RANGE OF HEADLAMPS

BACKGROUND OF THE INVENTION

The invention is based on a device for changing the range of headlights. One such device is known from German Patent Disclosure DE 29 52 217 A1. This device has a housing in which a drive motor is disposed, and by means of the drive motor an adjusting element is drivable in a rotary motion via a gear. The rotary motion of the adjusting element is converted via a threaded connection and a transmission element into a longitudinal motion that is transmitted to the headlight part, for instance its reflector, that is to be adjusted, and the range of the headlight is thereby adjusted. The adjusting element has an female thread, and the transmission element has an male thread; the adjusting element is supported rotatably but nondisplaceably in the direction of its longitudinal axis in the housing, while the transmission element is supported nonrotatably but displaceably in the direction of its longitudinal axis in the housing. Also connected to the transmission element in the longitudinal direction is a connecting element pivotably connected to the headlight part to be adjusted. In addition to a basic setting of the headlight part to be adjusted, an actuating element protruding out of the housing is provided, which is retained on the transmission element so as to be rotatable about its longitudinal axis but nondisplaceable in the longitudinal direction. The actuating element is connected to the connecting element via a further threaded connection. Upon a rotation of the actuating element, independently of the drive motor, the connecting element is moved in the longitudinal motion via its threaded connection, and this longitudinal motion is transmitted to the headlight part to be adjusted. The construction of this known device is complicated overall and requires many components, making it complicated and expensive to manufacture and assemble, which ought to be avoided in large-scale mass production.

SUMMARY OF THE INVENTION

The device for changing the range of headlights according to the invention has the advantage over the prior art that it is simple in construction and requires only a few components.

An embodiment of the device offers the advantage that the actuating element does not also rotate upon a rotation of the adjusting element caused by the drive motor. A further feature enables a secure coupling of the transmission element to the adjusting element once a basic setting of the range has been established.

BRIEF DESCRIPTION OF THE DRAWING

Three exemplary embodiments of the invention are shown in the drawing and described in further detail below. FIG. 4 shows the device in a longitudinal section in accordance with a third exemplary embodiment; and FIG. 5 shows the device in a cross section taken along the line V—V of FIG. 4.

DESCRIPTION OF THE PREFERRED EMBODIMENTS

Figure 1:
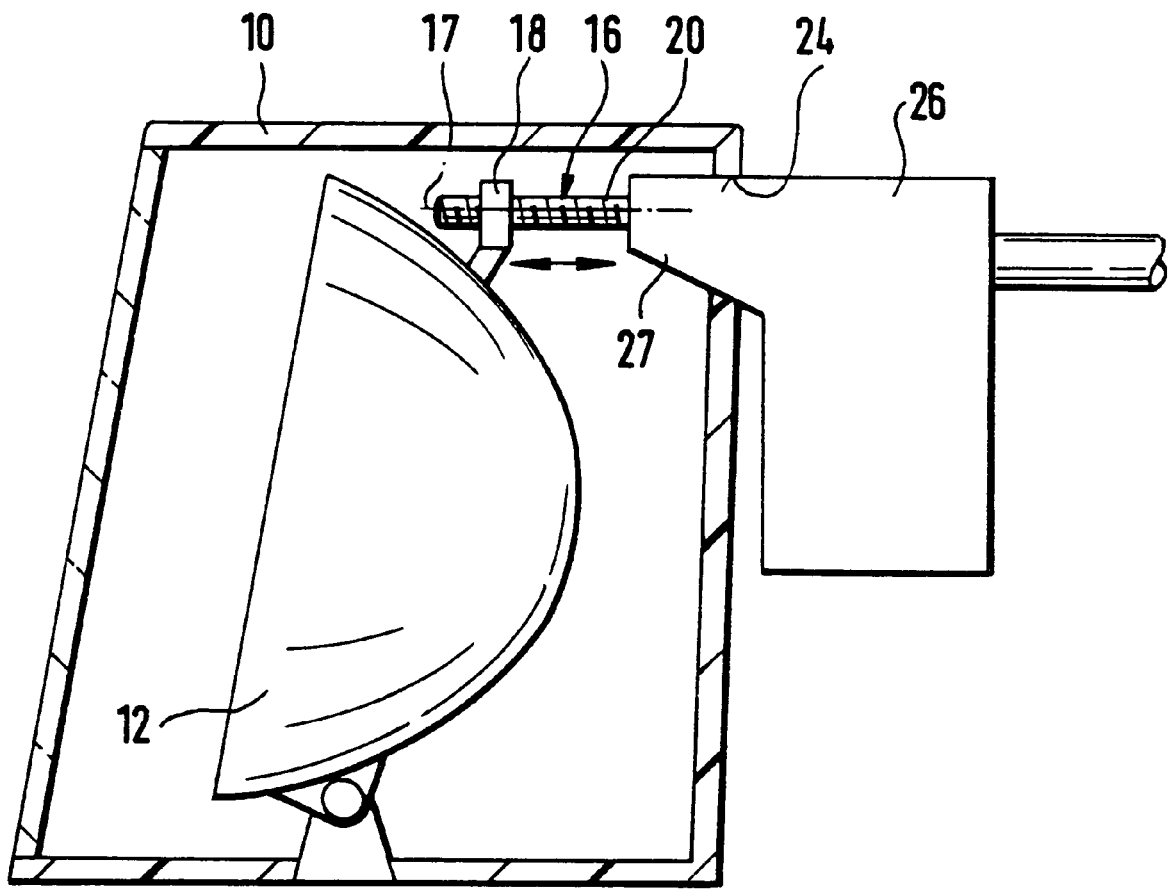
FIG. 1 in fragmentary form shows a headlight with a device for changing its range.

A headlight for vehicles, especially motor vehicles, shown in FIG. 1 has a housing 10, in which a reflector 12 is disposed that is pivotably supported in the housing 10 about at least a horizontal axis 14. When the reflector 12 is pivoted about the axis 14, the range of the headlight is changed. This changing of the range is necessary on the one hand to enable making a basic setting of a headlight, and on the other it is also needed in order to be able to compensate for changes in the inclination of the vehicle when loading, and thus to be able to keep the range at least approximately constant. The reflector 12 is eccentrically engaged with respect to the axis 14 by a connecting element 16, which by way of example is embodied as a threaded spindle. A nut 18, which is screwed onto the threaded shaft 20 of the threaded spindle 16, is connected to the reflector 12. The threaded spindle 16 is supported nondisplaceably in the direction of its longitudinal axis 17 but rotatably about its longitudinal axis 17 in the housing 10. Upon a rotation of the threaded spindle 16, the nut 18 is displaced in the direction of the longitudinal axis 17, and this longitudinal motion is transmitted to the reflector 12, which is then pivoted about the axis 14.

Figure 2:
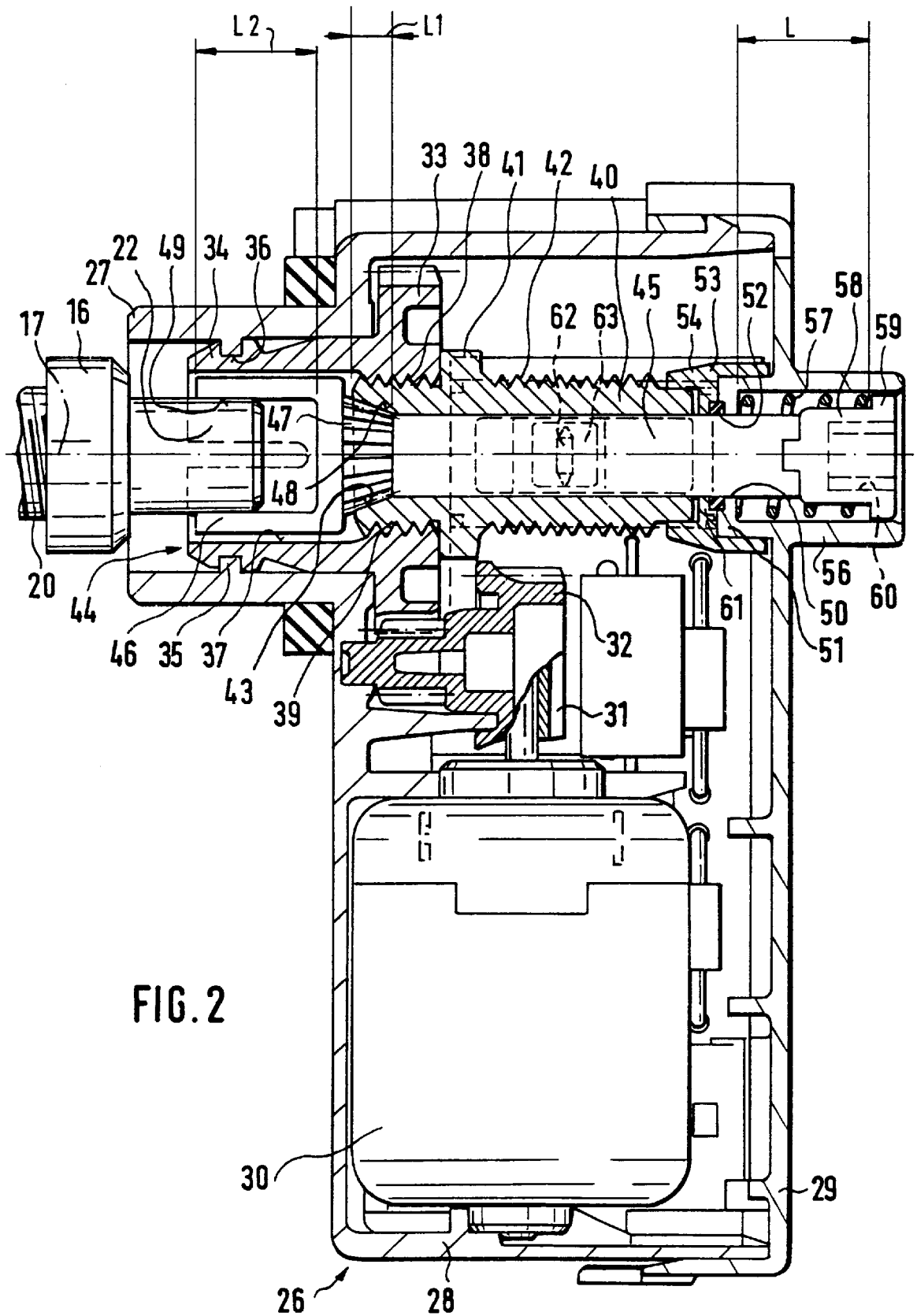
FIG. 2, on a larger scale, shows the device in a longitudinal section in accordance with a first exemplary embodiment.
Figure 3:
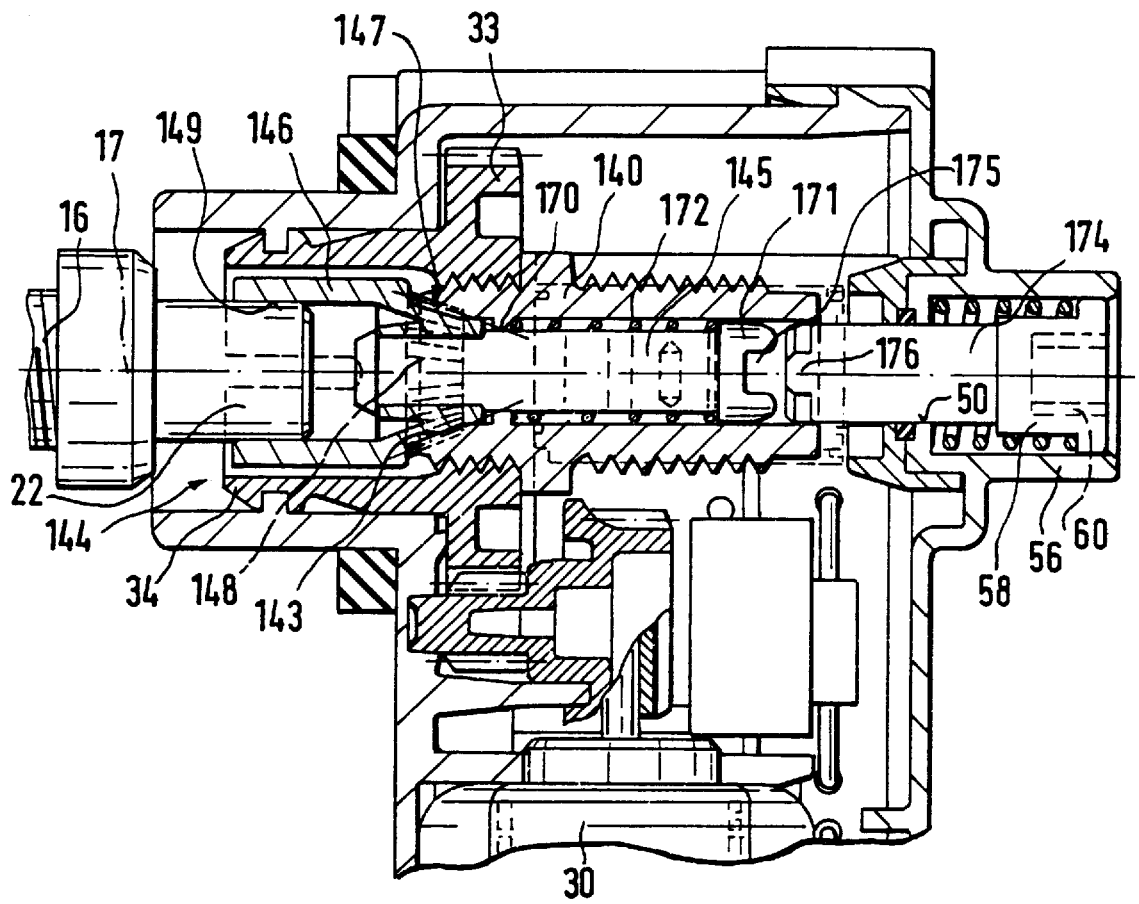
FIG. 3 shows the device in a longitudinal section in accordance with a second exemplary embodiment.

The housing 10 of the headlight has an opening 24, in the region of the end 22 of the threaded spindle 16 remote from the reflector 12. The end 22 of the threaded spindle 16 is engaged by a device for changing the range of headlights, which as shown in FIG. 2 and FIG. 3 has a housing 26, which has an extension 27 that can be inserted into the opening 24 of the headlight housing 10 and can be secured to the headlight housing 10, for instance in the manner of a bayonet mount. The housing 26 of the device has a cup-shaped housing part 28 and a cap 29 closing it, which by way of example can be connected in detentlike fashion to the housing part 28. It may be provided that the device automatically keeps the range constant as a function of the vehicle load, to which end suitable sensors for detecting the change in inclination of the vehicle and an evaluation device are required, by which the device is triggered. Alternatively, the device can also be actuated by the vehicle driver via a switch element.

A drive motor 30, preferably embodied as an electric motor, is disposed in the housing 26 of the device. The drive motor 30 drives a worm wheel 32, via a worm 31 disposed on its shaft, and in turn the worm wheel drives a gear wheel 33 via axially offset radial serrations. The gear wheel 33 has a cylindrical attachment 34 which protrudes into the extension 27 and is supported therein nondisplaceably in the direction of the longitudinal axis 17 of the threaded spindle 16 but rotatably about the longitudinal axis 17. The longitudinal axis 17 is thus also the rotary axis of the gear wheel 33. The axial fixation of the gear wheel 33 can be done for instance via one or more inward-projecting protrusions 35 on the extension 27 of the housing 26; these projections engage an annular groove 36 in the outer circumference of the adjoint piece 34 of the gear wheel 33. The gear wheel adjoint piece 34 may have one or more slits extending longitudinally, so that it can be resiliently compressed in the extension 27 for the mounting process.

The gear wheel 33 is disposed at least approximately coaxially to the longitudinal axis 17 of the threaded spindle 16 and has a coaxial through opening 37. On its end region remote from the adjoint piece 34, the gear wheel 33 has an female thread 38 in its through opening 37. A coaxial sleeve 40 provided with a external thread 39 is screwed into the female thread 38 of the through opening 37; it rests with a collar 41 on the gear wheel 33 in the axial direction and is thus rigidly joined to the gear wheel 33, so that the gear wheel 33 and the sleeve 40 form a unit. On the side of the collar 41 remote from the gear wheel 33, the sleeve 40 also has a portion 42 with an male thread. Toward the end region disposed in the through opening 37 of the gear wheel 33, the through bore of their sleeve 40 widens approximately conically and has a noncircular cross section. To that end, the through bore 40 preferably has a set of inner teeth 43 graduated over its circumference. The tooth profiles of the teeth 43 extend parallel to the longitudinal axis 17 of the sleeve 40. Alternatively, the sleeve 40 may also have a polygonal cross section, for instance.

In a first exemplary embodiment of the device, shown in FIG. 2, a transmission element 44 in the form of an adjusting bolt is inserted from the extension 27 of the housing 26 through the through bore 37 of the gear wheel 33 and the sleeve 40; this bolt has a smooth shaft 45 that passes through the sleeve 40 and a head 46, disposed in the region of the through opening 37 of the gear wheel 33, that has a larger diameter than the shaft 45. Between the head 46 and the shaft 45 of the adjusting bolt 44, there is a conically narrowing transitional portion 47, which has a likewise noncircular cross section embodied correspondingly to the cross section of the end region of the through bore of the sleeve 40, so that the adjusting bolt 44 is coupled to the sleeve 40 in the direction of rotation about the longitudinal axis 17. Preferably, the adjusting bolt 44 has a set of outer teeth 48, graduated over its circumference, in its transitional portion 47. The teeth profiles of the teeth 48 extend parallel to the longitudinal axis 17 of the adjusting bolt 44, which in turn is at least approximately coaxial to the longitudinal axis of the sleeve 40, of the gear wheel 33 and of the threaded spindle. The head 46 of the adjusting bolt 44 has a recess 49 of noncircular cross section, for instance with a four- or more-sided cross section, into which the end 22 of the threaded spindle 16, suitably shaped in terms of its cross section, enters. The threaded spindle 16 and the adjusting bolt 44 are thus coupled to one another in the direction of rotation about the longitudinal axis 17, but a relative motion in the direction of the longitudinal axis 17 between the threaded spindle 16 and the adjusting bolt 44 is possible without the end 22 of the threaded spindle 16 emerging from the recess 49 in the adjusting bolt 44. The recess 49 and the end 22 of the threaded spindle 16 are also embodied in such a way that upon a relative motion in the direction of the longitudinal axis 17, no rotation about the longitudinal axis 17 is brought about.

The cap 29 of the housing 26 has an opening 50, through which the shaft 45 of the adjusting bolt 44 that passes through the sleeve 40 protrudes. The opening 50 is surrounded by a larger-diameter extension 51 that protrudes from the cap 29 into the interior of the housing 26; toward the opening 50, the extension has a groove in which an elastic sealing element 52, for instance in the form of an O ring, is placed. A retaining element 53 is pressed onto the extension 51 and has a collar 54, which points toward the opening 50 and retains the sealing element 52 is retained in the groove. The retaining element 53 also has an adjoint piece 54 that fits over the end of the sleeve 40 toward the cap 29.

Coaxially to the inward-protruding extension 51, the cap 29 also has an outward-protruding extension 56, which is larger in diameter than the shaft 45 of the adjusting bolt 44 that protrudes through the opening 50. Thus between the shaft 45 and the inside circumference of the extension 56, an annular chamber remains, in which a resilient element 57 is disposed, which for instance is embodied as a helical compression spring that surrounds the shaft 45 and is supported on the bottom 61 of the extension 51. An attachment 58 is rigidly connected to the end of the shaft 45 of the adjusting bolt 44 that protrudes into the annular chamber, for instance by means of a thread or by press-fitting, or the like; this attachment is somewhat larger in diameter than the opening 50 in the bottom 61, and it has a head 59 of still further enlarged diameter. The spring 57 is fastened in the prestressed state between the bottom of the extension 55 and the shoulder formed at the transition of the attachment 58 toward its head 59. The attachment 58 has a recess 60, of noncircular cross section, for instance in the form of a hexagon, so that a tool can be inserted into it and the attachment 58 can be rotated about the longitudinal axis 17 by this tool.

A sensor element 63 has a tang 62 that engages the thread of the portion 42 of the sleeve 40, and this sensor element is displaceable in the housing 26 in the direction of the longitudinal axis 17 but is not rotatable about the longitudinal axis 17. Upon a rotation of the sleeve 40 the sensor element 63 is thus moved in the direction of the longitudinal axis 17, as a consequence of the thread of the portion 42.

The mode of operation of the device will now be described. In FIG. 2, the device is shown in a state in which changing the range can be done by means of the drive motor 30. In operation of the drive motor 30, the gear wheel 33 is set into a rotary motion about the longitudinal axis 17 via both the worm 31 and the worm wheel 32. As already noted above, the gear wheel 33 and the sleeve 40 form a unit and can also be called an adjusting element. Because of the prestressed spring 57, the transitional portion 47 of the adjusting bolt 44 is pressed with its outer teeth 48 in the direction of the longitudinal axis 17 into the end portion of the through bore of the sleeve 40, with its inner teeth 43, so that the sets of teeth 43, 48 mesh, and the adjusting bolt 44 is coupled to the adjusting element 33, 40 in the direction of rotation about the longitudinal axis 17. The rotary motion of the adjusting element 33, 34 is thus transmitted to the adjusting bolt 44, by which in turn the end 22 disposed in the recess 49 of its head 46, and thus the threaded spindle 16, are rotated about the longitudinal axis 17, causing the reflector 12 to be pivoted about the axis 14 in order to change the range. A rotary motion of the adjusting bolt 44 brought about by the drive motor 30 is thus transmitted to the attachment 58, which thus rotates as well. Upon the rotation of the sleeve 40, the sensor element 63, because of its connection via the tang 62 with the threaded portion 42 of the sleeve 40, is moved in the direction of the longitudinal axis 17. This motion may for instance be transmitted to a potentiometer or some other device, in which the position of the sensor element 63 is detected and evaluated. The sensor element 63 serves to detect the actual position of the reflector 12, and thus the actual setting of the range.

If a basic setting of the range of the headlight is necessary, then to that end the drive motor 30 is not operated but instead the adjusting bolt 44 is grasped manually and rotated. In this operation, a tool is inserted into the recess 60 of the attachment 58, and this attachment is thus displaced, beginning at the position shown in FIG. 2 initially in the direction of the longitudinal axis 17 into the housing 26 by pressure counter to the prestressing of the spring 57. In the axial direction, the attachment 58 can be inserted so far, by a travel distance L into the extension 56 that it is seated on the bottom 61, which thus forms a stop for the attachment 58. Upon the axial displacement of the attachment 58, the adjusting bolt 44 is axially displaced as well, whereupon its outer teeth 48 comes out of engagement with the inner teeth 43 of the sleeve 40. The travel distance L is at least as great or somewhat greater than the travel distance L1 by which the adjusting bolt 44 must be displaced in the axial direction in order to bring its teeth 48 out of engagement with the teeth 43 of the sleeve 40. An axial relative motion of the adjusting bolt 44 with respect to the threaded spindle 16 is also brought about, and this motion is possible over a travel distance L3 which is at least as great or greater than the travel distance L1. Because the teeth 48 of the adjusting bolt 44 come out of engagement with the teeth 43 of the sleeve 40, the adjusting bolt 44 can be rotated about the longitudinal axis 17 via the attachment 58, without this rotation being transmitted to the sleeve 40 and thus to the adjusting element 33, 40; because of self-inhibition of the gear 31, 32 and of the drive motor 30, the gear wheel 33 cannot rotate. This rotation is, however, transmitted to the threaded spindle 16, via its end 22 disposed in the recess 49 of the adjusting bolt 44, so that the reflector 12 is pivoted about the axis 14, and the range of the headlight is changed. The attachment 58 thus forms an actuating element, by which a basic setting of the range of the headlight is made possible. Once the basic setting has been established, the tool is removed from the attachment 58 again, and the adjusting bolt 44, urged by the spring 57, with its teeth 48 enters again into engagement with the teeth 43 of the sleeve 409, and a change in the range can again be effected via the drive motor 30.

In FIG. 3, the device is shown in accordance with a second exemplary embodiment, in which the basic construction is unchanged but the embodiment of the adjusting bolt is modified. What will now be described is essentially only those components of the device that differ from the first exemplary embodiment; identical components are identified by the same reference numerals as in the first exemplary embodiment. The gear wheel 33 that can be driven by the drive motor 30 is rigidly connected to the sleeve 140, in whose through opening an encompasses collar 170 protrudes inward. The transmission element 144 is embodied in the form of a multipart adjusting bolt and has a first adjusting bolt part 145, which is disposed, over the predominant portion of its length, in the through opening of the sleeve 140. A second adjusting bolt part 146 is secured on the end region of the adjusting bolt part 145 that protrudes out of the sleeve 140 into the adjoint piece 34 of the gear wheel 33, and this second adjusting bolt forms a head of the multipart adjusting bolt and has a recess 149, which is embodied like the recess of the head 46 of the adjusting bolt 44 in the first exemplary embodiment, and in which the end 22 of the threaded spindle 16 is disposed nonrotatably but displaceably in the direction of the longitudinal axis 17.

The second adjusting bolt part 146 has a portion 147, protruding into the end region of the through opening of the sleeve 140, which portion, like the transmission element 47 of the adjusting bolt 44, is embodied with a noncircular cross section and which preferably has a set of outer teeth 148 graduated over its circumference. The portion 147 of the adjusting bolt part 146 tapers toward the sleeve 140 and may for instance be embodied approximately conically. The through opening of the sleeve 140, on its end region oriented toward the second adjusting bolt part 146, likewise has a noncircular cross section and preferably has a set of inner teeth 143. The through opening of the sleeve 140 widens in its end region and may for example be embodied approximately conically.

The first adjusting bolt part 145, in its end region located in the sleeve 140, has a lead 171 of enlarged diameter, which may be embodied integrally with the adjusting bolt part 145 or may be embodied as a separate part that is rigidly joined to the adjusting bolt part 145. Between the collar 170 of the sleeve 140 and the lead 171 of the adjusting bolt part 145, a prestressed resilient element 172 is fastened, by means of which the two adjusting bolt parts 145 and 146 are drawn into the sleeve 140. The resilient element 172 is embodied as a helical compression spring, for instance, which is disposed in an annular chamber that is present between the adjusting bolt part 145 and the through opening of the sleeve 140. The head 171 of the adjusting bolt part 145 has a noncircular cross section on its end region pointing away from the spring 172.

A third adjusting bolt part 174 protrudes with one end region into the through opening of the sleeve 140 and with the other end region protrudes through the opening 50 in the cap 29 into the outer extension 56. The third adjusting bolt part 174 is displaceable relative to the sleeve 140 in the direction of the longitudinal axis 17 and is rotatable about the longitudinal axis 17. The end region of the third adjusting bolt part 174 that is disposed in the sleeve 140 has a noncircular cross section, and the cross sections of the head 171 of the first adjusting bolt part 145 and of the end region of the third adjusting bolt part 174 are embodied such that they can be coupled in the direction of rotation about the longitudinal axis 17. The head 171 and the end region of the adjusting bolt part 174 may for instance be embodied in the manner of a claw coupling; the head 171 has one or more axial grooves 175, and the end region of the adjusting bolt part 174 correspondingly has one or more protrusions 176, which can plunge into the grooves 175. The attachment 58 can be embodied integrally with the third adjusting bolt part 174, or may be embodied as a separate component and rigidly joined to the adjusting bolt part 174.

The mode of operation of the device in accordance with a second exemplary embodiment will now be described. In the event of change in the range performed by the drive motor 30, the mode of operation is substantially like that described for the first exemplary embodiment. Because of the spring 174, however, the third adjusting bolt part 174 is not connected in the direction of rotation to the adjusting bolt part 145 but rather is disposed with axial spacing from it, so that a rotary motion of the adjusting bolt part 145 is not transmitted to the third adjusting bolt part 174 and to the attachment 58. For a basic setting of the range, a tool is inserted into the recess 60 of the attachment 58, and the attachment 58 together with the third adjusting bolt part 174 is displaced in the axial direction by the travel distance L, until the attachment 58 is seated on the bottom 61. Over a first portion of the travel distance L, the third adjusting bolt part 174 is coupled to the first adjusting bolt part 145 in the direction of rotation about the longitudinal axis 17, by the fact that its protrusions 176 plunge into the grooves 175. After a certain portion of the travel distance L, the third adjusting bolt part 174 comes to rest in the axial direction on the first adjusting bolt part 145, and upon further axial displacement, the first adjusting bolt part 145 and the second adjusting bolt part 146, rigidly joined to it, are displaced jointly in the axial direction. The spring 172 is compressed in the process, and the outer teeth 148 of the second adjusting bolt part 146 come out of engagement with the inner teeth 143 of the sleeve 140, so that the attachment 58 can be rotated about the longitudinal axis 17; both the adjusting bolt parts 174, 145 and 146 and the threaded spindle 16 are jointly rotated in the process, the effect being a change in the range. Once the tool is removed from the recess 60 again, the sets of teeth 148, 143 enter into engagement again because of the spring 172, and the third adjusting bolt part 174 is again disconnected in the axial direction from the first adjusting bolt part 45, because of the spring 157.

In FIGS. 4 and 5, the device in accordance with a third exemplary embodiment is shown. The gear wheel 233 and the sleeve 240 are embodied in one piece. An adjusting bolt 244 has a shaft 245, which is disposed in the sleeve 240 and has a collar 270 of enlarged diameter. The adjusting bolt 244 has a further collar 280, disposed near the cap 229 of the housing 226. A head 258 which is embodied integrally with the adjusting bolt 244 is disposed in the outward-protruding extension 256 of the cap 229 and has the recess 260. An elastic sealing element 252 is fastened between the head 258 and the extension 256. The prestressed resilient element 257, which is preferably embodied as a helical compression spring, is fastened between the attachment 258 and the bottom 261 of the extension 256. By means of the spring 257, the adjusting bolt 244 is drawn with its collar 280 against the inside of the cap 229. The cap 229 may have an inward-protruding extension 251, which in particular can be opened wider elastically, so that the adjusting bolt 244 can be pushed through from the outer extension 256.

An attachment 281 is disposed on the end region 246 of the adjusting bolt 244 opposite the shaft 245 on the collar 270 in such a way as to be rotatable about the longitudinal axis 17 and displaceable in the direction of the longitudinal axis 17. As in the exemplary embodiments described above, the attachment 281 has a conical portion with a set of outer teeth 248, and the through opening of the sleeve 240 or of the gear wheel 233 widens conically in its end region and has a set of inner teeth 243. The attachment 281 moreover has a region 283 protruding into the sleeve 240, for instance in the form of a prong, for which the side of the collar 270 pointing toward the attachment 281 forms a stop in the direction of the longitudinal axis 17. The attachment 281 is guided in a through opening 237 of the adjoint piece 234 of the gear wheel 233 so as to be rotatable about the longitudinal axis 17 and displaceable in the direction of the longitudinal axis 17.

Inserted into the extension 227 of the housing 226 is an insert 284, which is rotatable in the extension 227 about the longitudinal axis 17 but is not displaceable in the direction of the longitudinal axis 17. The axial fixation of the insert 284 may be effected for instance like that of the adjoint piece 234 of the gear wheel 233, via one or more protrusions projecting inward from the extension 227 that engage a groove in the circumference of the insert 284. The insert 284 has a recess 249, in which the end 22 of the threaded spindle 16 is disposed and is coupled to the insert 284 in the direction of rotation about the longitudinal axis 17.

The insert 284 has a sleevelike portion 285, which protrudes into the through opening 237 of the adjoint piece 234 of the gear wheel 233 and into which the end region 246 of the adjusting bolt 244 protrudes. The sleeve 285, in its end region toward the recess 249, and the end region 246 of the adjusting bolt 244 are embodied in the manner of a claw coupling. A prestressed resilient element 287, which is preferably embodied as a helical compression spring is fastened between a collar 286 of the insert 284 and the attachment 281. By means of the spring 287, the attachment 281 is pressed into the sleeve 240 in the direction of the longitudinal axis 17, so that the teeth 248 of the attachment 281 and the teeth 243 of the sleeve 240 mesh. The attachment 281 comes to rest with its prong 283 on the collar 270.

The attachment 281 is coupled to the sleeve 285 of the insert 284 in the direction of rotation about the longitudinal axis 17, for example via a tongue and groove connection as shown in FIG. 5; the attachment 281 may have an axial groove 288 and the sleeve 285 may have an axial protrusion 289 acting as the tongue. The coupling of the attachment 281 to the sleeve 285, however, is of such a kind that the attachment 281 is rotatable about a predetermined angular range about the longitudinal axis 17 relative to the sleeve 285 before the mutual coupling of these parts in the direction of rotation comes about. For example, a rotatability over an angular range of approximately 5° to 20°, and preferably approximately 15°, may be provided. By way of example, the groove 288 of the attachment 281 may be somewhat wider, in the circumferential direction about the longitudinal axis 17, than the protrusion 289 of the sleeve 285.

The mode of operation of the device in accordance with a third exemplary embodiment will now be described. In FIG. 4, the device is shown in a state in which a change in the range by the drive motor 30 can be brought about. Because of the spring 287, the teeth 248 of the attachment 281 and the teeth 243 of the sleeve 240 mesh, and the rotary motion of the attachment 281 is transmitted via its tongue and groove connection 288, 289 to the sleeve 285 of the insert 284 and from it to the threaded spindle 16. The insert 284 and the attachment 281 form the transmission element in the third exemplary embodiment. Because of the relative rotatability of the attachment 281 and the sleeve 285, the transmission of the rotary motion may possibly not occur until after the attachment 281 has rotated over the predetermined angular range, but this has only a negligibly slight influence on the accuracy of the change in the range, because the pitch of the thread of the threaded spindle 16 is so slight.

To establish a basic setting, a tool is inserted into the recess 260 of the attachment 258, and the adjusting bolt 244 is pressed into the housing 226 counter to the prestressing of the spring 257. In the third exemplary embodiment, the adjusting bolt 244 forms the actuating element by which the basic setting of the range is established. In this process, the attachment 281 is displaced over a first portion of the displacement path of with its prong 283 on the collar 270. The teeth 248 of the attachment 281 are brought out of engagement with the teeth 243 of the sleeve 240, so that the attachment 281 is now no longer coupled to the gear wheel 233 in the direction of rotation. Upon further insertion of the adjusting bolt 244, its end region is coupled to the sleeve 285 by the claw coupling in the direction of rotation about the longitudinal axis 17. Upon a rotation of the adjusting bolt 244 effected by the tool, the insert 284 is thus rotated as well, and the range is changed via the threaded spindle 16. When the tool is removed again, the adjusting bolt 244 is pulled outward by the spring 257 until it rests with its collar 280 on the inside of the cap 229. In this process, the claw coupling between the adjusting bolt 244 and the sleeve 285 of the insert 284 is disengaged again as well. The attachment 281 is pressed into the sleeve 240 by the spring 287, so that the teeth 248 of the attachment enter into engagement with the teeth 243 of the sleeve 243 once again. The relative rotatability of the attachment 281 relative to the sleeve 285 makes it possible for the attachment 281 to rotate into a rotated position in which its teeth 248 can enter into engagement with the teeth 243 of the sleeve 240 even if initially tooth meets tooth here, while meshing or engagement is actually possible only when one tooth meets a corresponding gap. In this case, rotation of the attachment 281 can occur until the tooth and gap meet.

What is claimed is:

1. A device for changing a vertical aim of headlights, comprising a headlight part to be adjusted; a drive motor; an adjusting element drivable by said drive motor so as to execute a rotary motion, said adjusting element being supported rotatably about a longitudinal axis but non displaceably in direction of said longitudinal axis, so that the rotary motion of said adjusting element is converted into a longitudinal motion that is transmitted to said headlight parts to be adjusted; a transmission element selectively coupled with said adjusting element in direction of rotation about said longitudinal axis; a connecting element pivotably connected to said headlight part to be adjusted and coupled with said transmission element in direction of rotation; a restoring element which secures a coupling of said transmission to said adjusting element and is prestressed in direction of said longitudinal axis; an actuating element via which a basic setting of the vertical aim can be exerted independently of said drive motor upon coupling of said transmission element to said adjusting element in such a way that the coupling is disengaged counter to a force of said restoring element so that said transmission element is rotatable relative to said adjusting element.

2. A device as defined in claim 1, wherein said transmission element has a portion of non circular cross-section, and said adjusting element also has a portion of non circular cross-section so as to provide a coupling of said transmission element to said adjusting element in direction of rotation, said portions of non circular cross-section being selectively inserted into one another in direction of said longitudinal axis.

3. A device as defined in claim 2, wherein said portion of said transmission element and said portion of said adjusting element each have a set of teeth which is graduated over circumference.

4. A device as defined in claim 1; and further comprising a housing, said transmission element passing through said adjusting element and being selectively coupled directly with said adjusting element in direction of rotation, said actuating element forming a part of said transmission element, said restoring element being prestressed between said transmission element and said housing.

5. A device as defined in claim 1; and further comprising a further prestressed resilient element, said transmission element having a first portion and a second portion, said restoring element being fastened between said first portion of said transmission element and said adjusting element, said second portion of said transmission element being selectively coupled to said adjusting element in direction of rotation, said actuating element being displaceable in direction of said longitudinal axis counter to a prestressing of said further prestressed resilient element and being selectively coupled to said first portion in direction of rotation, said second portion of said transmission element by means of said actuating element being displaceable in direction of said longitudinal axis, and as a result a coupling of said actuating element to said adjusting element in direction of rotation is disengaged.

6. A device as defined in claim 5, wherein said second portion of said transmission element is a separate part which is rigidly connected to said first portion.

7. A device as defined in claim 5, wherein said actuating element is selectively coupled to said first portion of said transmission element in direction of rotation with a claw-shaped coupling.

8. A device as defined in claim 1; and further comprising a further prestressed resilient element, said transmission element being non displaceably supported in direction of said longitudinal axis, said transmission element having a component which is coupled to said transmission element in direction of rotation but is displaceable in direction of said longitudinal axis, said component being selectively coupled to said adjusting element in direction of rotation, said restoring element being fastened between said transmission element and said component, said actuating element being displaceable in direction of said longitudinal axis counter to a prestressing of said further resilient element, said actuating element being formed so that a coupling of said component of said adjusting element is disengaged and said actuating element being coupled in direction of rotation to said transmission element.

9. A device as defined in claim 8, wherein said component is rotatable about said longitudinal axis by a predetermined limited angular range relative to said transmission element.

10. A device as defined in claim 9, wherein said actuating element is selectively coupled with said transmission element with a claw-shaped coupling.

* * * * *